United States Patent
Hutchison et al.

(10) Patent No.: US 12,078,754 B1
(45) Date of Patent: Sep. 3, 2024

(54) LIDAR TRANSMITTER ASSEMBLY

(71) Applicant: Waymo LLC, Mountain View, CA (US)

(72) Inventors: David Hutchison, Santa Clara, CA (US); James Dunphy, San Jose, CA (US); Pierre-Yves Droz, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 919 days.

(21) Appl. No.: 17/138,172

(22) Filed: Dec. 30, 2020

(51) Int. Cl.
| | |
|---|---|
| *G01S 7/481* | (2006.01) |
| *G01S 7/484* | (2006.01) |
| *G01S 7/486* | (2020.01) |
| *G01S 7/497* | (2006.01) |
| *G01S 17/931* | (2020.01) |
| *G05D 1/00* | (2024.01) |

(52) U.S. Cl.
CPC .......... *G01S 7/4813* (2013.01); *G01S 7/484* (2013.01); *G01S 7/486* (2013.01); *G01S 7/4972* (2013.01); *G01S 17/931* (2020.01); *G05D 1/024* (2013.01)

(58) Field of Classification Search
CPC ........ G01S 7/4813; G01S 7/484; G01S 7/486; G01S 7/4972; G01S 17/931; G05D 1/024
See application file for complete search history.

(56) References Cited

U.S. PATENT DOCUMENTS

| | | | |
|---|---|---|---|
| 8,097,852 B2 * | 1/2012 | Yao | ........................ G01S 17/04 |
| | | | 250/339.01 |
| 9,753,462 B2 | 9/2017 | Gilliland et al. | |
| 10,003,168 B1 | 6/2018 | Villeneuve | |
| | (Continued) | | |

FOREIGN PATENT DOCUMENTS

WO    2019/205164    10/2019

OTHER PUBLICATIONS

Li et., "Rapidly Tunable Millimeter-Wave Optical Transmitter for Lidar-Radar," IEEE Transaction on Microwave Theory and Techniques, Oct. 2001, pp. 2048-2054, vol. 49, No. 10.

(Continued)

*Primary Examiner* — Isam A Alsomiri
*Assistant Examiner* — Joseph C Fritchman
(74) *Attorney, Agent, or Firm* — McDonnell Boehnen Hulbert & Berghoff LLP

(57) ABSTRACT

The present disclosure relates to optical transmitter modules, lidar systems, and methods of their manufacture. An example optical transmitter module includes a transparent substrate and a plurality of wires disposed along the transparent substrate. The optical transmitter module includes driver circuitry electrically-coupled to at least a portion of the plurality of wires and one or more light-emitter devices electrically-coupled to at least a portion of the plurality of wires. The light-emitter device(s) are configured to emit light pulses. The optical transmitter module also includes a fast axis collimation lens disposed along the transparent substrate. The fast axis collimation lens is configured to (Continued)

collimate the light pulses so as to provide collimated light. The optical transmitter module also includes one or more waveguide structures disposed along the transparent substrate within an optical region. The optical transmitter module also includes a lid configured to provide a sealed interior volume.

20 Claims, 18 Drawing Sheets

(56) References Cited

U.S. PATENT DOCUMENTS

| | | |
|---|---|---|
| 10,222,474 B1 | 3/2019 | Raring et al. |
| 2003/0201462 A1* | 10/2003 | Pommer ............. G02B 6/4259 257/200 |
| 2006/0013270 A1 | 1/2006 | Yumoto et al. |
| 2006/0039658 A1 | 2/2006 | Furuyama et al. |
| 2013/0272330 A1 | 10/2013 | Joseph et al. |
| 2018/0278011 A1* | 9/2018 | Galvano ............... G01S 7/4813 |
| 2019/0072649 A1 | 3/2019 | Droz et al. |
| 2020/0088876 A1* | 3/2020 | Tanemura ............. G01S 7/006 |
| 2020/0103504 A1 | 4/2020 | Talty et al. |
| 2020/0132851 A1 | 4/2020 | Gassend et al. |
| 2020/0182973 A1 | 6/2020 | Luff et al. |
| 2020/0278426 A1 | 9/2020 | Dummer et al. |
| 2020/0279839 A1 | 9/2020 | Last et al. |
| 2020/0284883 A1 | 9/2020 | Ferreira et al. |

OTHER PUBLICATIONS

Spinhirne, James D., "Micro Pulse Lidar," IEEE Transactions on Geoscience and Remote Sensing, Jan. 1993, pp. 48-55, vol. 31, No. 1.

Wake et al., "Optical system design and integration of the Global Ecosystem Dynamics Investigation Lidar," Conference Paper, NASA/Goddard Space Flight Center et al., Aug. 2019, 14 pages.

* cited by examiner

Section A-A

Section A-A

Section A-A

LIDAR TRANSMITTER ASSEMBLY

BACKGROUND

Light detection and ranging (LIDAR or Lidar) devices may be adversely affected by environmental conditions such as moisture, rain, mud, etc. Furthermore, conventional lidar systems can be undesirably bulky and obtrusive. Accordingly, compact, monolithic lidar systems are desired that can provide all-weather performance and sealed protection for delicate electronic and optical components.

SUMMARY

The present disclosure relates to an optical transmitter portion of a lidar system that is substantially sealed and/or protected from environmental effects. In some examples, such examples could include lidar systems configured to be utilized with self-driving vehicles.

In a first aspect, an optical transmitter module is provided. The optical transmitter module includes a transparent substrate. The optical transmitter module also includes a plurality of wires disposed along a first surface of the transparent substrate and driver circuitry electrically-coupled to at least a portion of the plurality of wires. The optical transmitter module further includes one or more light-emitter devices electrically-coupled to at least a portion of the plurality of wires. The one or more light-emitter devices are configured to emit light pulses. The optical transmitter module yet further includes a fast axis collimation lens disposed along the first surface. The fast axis collimation lens is configured to collimate the light pulses so as to provide collimated light. The optical transmitter module also includes one or more waveguide structures disposed along the first surface of a transparent substrate within an optical region. The one or more waveguide structures include respective reflective surfaces. The one or more waveguide structures are configured to optically guide the collimated light toward the respective reflective surfaces so as to provide transmit light to an environment. The optical transmitter module also includes an aperture substrate having a plurality of optical apertures. The aperture substrate is disposed proximate to the optical region. The optical transmitter module additionally includes a lid coupled to the transparent substrate and the aperture substrate, wherein the lid is configured to provide a sealed interior volume. The optical transmitter module further includes at least one capacitor disposed between the lid and the driver circuitry.

In a second aspect, a lidar system is provided. The lidar system includes an optical transmitter module with a transparent substrate and a plurality of wires disposed along a first surface of the transparent substrate. The optical transmitter module also includes driver circuitry electrically-coupled to at least a portion of the plurality of wires and one or more light-emitter devices electrically-coupled to at least a portion of the plurality of wires. The one or more light-emitter devices are configured to emit light pulses. The optical transmitter module additionally includes a fast axis collimation lens disposed along the first surface. The fast axis collimation lens is configured to collimate the light pulses so as to provide collimated light. The optical transmitter module also includes one or more waveguide structures disposed along the first surface of a transparent substrate within an optical region. The one or more waveguide structures include respective reflective surfaces. The one or more waveguide structures are configured to optically guide the collimated light toward the respective reflective surfaces so as to provide transmit light to an environment. The optical transmitter module additionally includes an aperture substrate that includes one or more optical apertures. The aperture substrate is disposed proximate to the optical region. The optical transmitter module yet further includes a lid coupled to the transparent substrate and the aperture substrate. The lid is configured to provide a sealed interior volume. The optical transmitter module also includes at least one capacitor disposed between the lid and the driver circuitry. The lidar system also includes an optical receiver module having one or more detector devices configured to detect receive light from the environment by way of the optical region of the transparent substrate and the one or more optical apertures.

In a third aspect, a method is provided. The method includes coupling a fast axis collimation lens and one or more waveguide structures to a first surface of a transparent substrate. The method also includes forming a plurality of wires along the first surface and bonding at least one light-emitter die and a driver circuitry to the plurality of wires. The method yet further includes patterning one or more optical apertures along a surface of an aperture substrate and attaching the aperture substrate proximate to an optical region of the first surface. The method also includes forming at least one capacitor on the driver circuitry. The method further includes attaching a lid to the transparent substrate and the aperture substrate, so as to form a sealed interior volume.

Other aspects, embodiments, and implementations will become apparent to those of ordinary skill in the art by reading the following detailed description, with reference where appropriate to the accompanying drawings.

DETAILED DESCRIPTION

Figure 1:
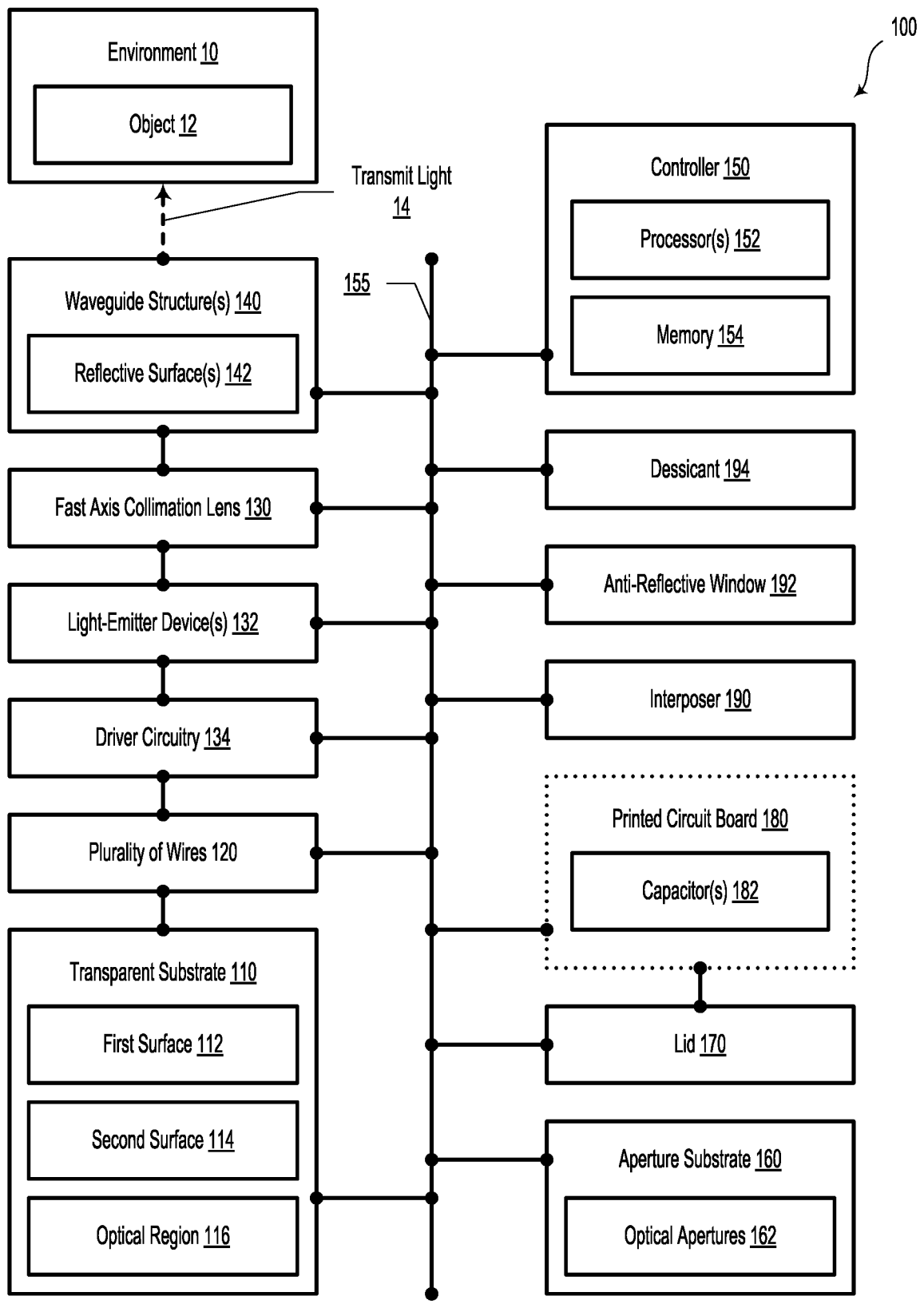
FIG. 1 illustrates an optical transmitter module, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Present embodiments can provide a compact lidar system that utilizes a multi-element assembly that includes semiconductor circuit elements, one or more light-emitter devices, one or more detector devices, and optical aperture, lens, and waveguide elements. Such a multi-element assembly can be fabricated with semiconductor processing techniques.

Example embodiments describe an optical transmitter portion, such as of a lidar system, that is substantially sealed and/or protected from environmental effects. For example, the one or more light-emitter device(s) (e.g., laser diodes), driver circuitry (e.g., ASIC), fast axis collimator, light guide manifold, and/or a "capping" printed circuit board could be arranged in a compact "stack-up".

In some embodiments, a first surface of a transparent substrate could be patterned with electrical traces, which could include electroplated metal. The one or more light-emitter device(s) and the driver circuitry could be disposed along the first surface of the transparent substrate and could be electrically coupled via the electroplated traces. The light-emitter device(s) could be configured to emit light pulses toward a fast axis collimator element also disposed along the first surface. The fast axis collimator could be configured to collimate light so as to optically couple into the light guide manifold.

The "capping" printed circuit board could be disposed so as to cover the driver circuitry, the light-emitter device(s), the fast axis collimator, and at least a first portion of the light guide manifold with respect to the environment. In some examples, the printed circuit board could be thermally coupled to the driver circuitry and light-emitter device(s) by way of a thermally conductive material, such as silver epoxy. A second portion of the light guide manifold could be covered with an optically transparent coverglass, which may include one or more optically-opaque pinholes. In an example embodiment, the optically-opaque pinholes could form an array of pinhole apertures. The pinhole array could be fabricated along the coverglass by way of optical lithography. The light guide manifold could include a plurality of optical waveguides with respective mirrors configured to direct light pulses toward the environment (e.g., out of plane). The redirected light pulses could be emitted toward the environment by way of the light guide manifold, mirror, coverglass, and aperture plate.

In an example embodiment, the electrical traces could provide a shim so as to vertically align the light-emitter device(s) with respect to the fast axis collimator.

In some embodiments, the optical transmitter portion could include an optically opaque lid that could be coupled to the coverglass. The lid could include an array of larger-diameter apertures that are aligned with the pinhole apertures of the coverglass. In some examples, the lid could be coupled to the coverglass and/or printed circuit board by way of an epoxy seal and/or a thermal interface material (TIM). Yet further, a desiccant material could be included under the lid so as to maintain a low humidity level within the optical transmitter module.

In various examples, an interposer could be coupled to the electrical traces and the substrate. In such scenarios, the interposer could provide a way to electrically connect to the driver circuitry and light-emitter device(s).

II. Example Optical Transmitter Modules

FIG. 1 illustrates an optical transmitter module 100, according to an example embodiment. Optical transmitter module 100 could include a portion of a lidar system configured to emit light pulses and direct them towards objects 12 in a scene. In specific embodiments, the optical transmitter module 100 could help provide lidar functionality for a self-driving vehicle, a robot, or another type of vehicle configured to navigate its environment 10.

The optical transmitter module 100 includes a transparent substrate 110. The transparent substrate 110 could be formed from silica glass, polycarbonate, or another optically transparent material. In some embodiments, the transparent substrate 110 could include a square or rectangular glass plate.

The optical transmitter module 100 also includes a plurality of wires 120 disposed along a first surface 112 of the transparent substrate 110. In such scenarios, the plurality of wires 120 could include an electroplated conductive material. It will be understood that other conductive materials are possible and contemplated.

The optical transmitter module 100 additionally includes a driver circuitry 134 that is electrically-coupled to at least a portion of the plurality of wires 120. The driver circuitry 134 could include a field-effect transistor (FET) based pulsed laser diode driver. The driver circuitry 134 could be operable to provide a voltage and/or current pulse.

The optical transmitter module 100 further includes a plurality of light-emitter device(s) 132 electrically-coupled to at least a portion of the plurality of wires 120. The light-emitter device(s) 132 are configured to emit light pulses in response to a voltage and/or current pulse from the driver circuitry 134. In some embodiments, the light-emitter device(s) 132 could include laser diodes configured to emit light with wavelength around 905 nm. It will be understood that other wavelengths are possible and contemplated.

The optical transmitter module 100 additionally includes a fast axis collimation lens 130 disposed along the first surface 112. The fast axis collimation lens 130 is configured to collimate the light pulses so as to provide collimated light. The fast axis collimation lens 130 could include an optical fiber or another type of cylindrical lens.

The optical transmitter module 100 further includes a plurality of waveguide structures 140 disposed along the first surface 112 of a transparent substrate 110 within an optical region 116. The waveguide structures 140 include respective reflective surfaces 142. The waveguide structures 140 are configured to optically guide the collimated light toward the respective reflective surfaces 142 so as to provide transmit light to an environment 10.

The optical transmitter module 100 yet further includes an aperture substrate 160. The aperture substrate 160 includes a plurality of optical apertures 162. The aperture substrate 160 is disposed proximate to the optical region 116. In some embodiments, the optical apertures 162 could be pinhole apertures that are formed in black paint or another opaque material configured to absorb or reflect light.

The optical transmitter module 100 also includes a lid 170 coupled to the transparent substrate 110 and the aperture substrate 160. The lid 170 is configured to provide a sealed interior volume (e.g., sealed interior volume 202 as illustrated in reference to FIG. 2).

In some embodiments, the optical transmitter module 100 additionally includes a printed circuit board 180 that includes at least one capacitor 182. The printed circuit board 180 is disposed between the lid 170 and the driver circuitry 134 and the plurality of light-emitter device(s) 132. In some example embodiments, the printed circuit board 180 is coupled to the driver circuitry 134 and the plurality of light-emitter device(s) 132 by way of silver epoxy. In some example embodiments, the capacitors 182 could provide a desired capacitance as part of a characteristic resistance-inductance-capacitance (RLC) or resistance-capacitance (RC). In various examples, the characteristic RLC or RC may relate to a characteristic time constant for light pulses emitted from the light-emitter device(s) 132 and/or driver circuitry 134.

Additionally or alternatively, the at least one capacitor 182 could be formed and/or coupled directly onto the driver circuitry 134. In an example embodiment, silicon capacitors could be surface mounted to a top surface of the driver circuitry 134, which may be provided in an application-specific integrated circuit (ASIC). Other ways to incorporate or integrate the at least one capacitor 182 are possible and contemplated.

In some embodiments, a thermal interface material (TIM) could be disposed between the lid 170 and the printed circuit board 180 and/or the at least one capacitor 182. In some examples, the thermal interface material could include a silicone or acrylic interface pad. It will be understood that other thermally conductive materials are possible and contemplated.

In example embodiments, the lid 170 could be physically coupled to the transparent substrate 110 and the aperture substrate 160 by way of an epoxy material.

In various examples, the optical transmitter module 100 could include a spring-spring interposer 190 electrically-coupled to a portion of the wires 120. In some examples, the interposer 190 could provide an electrical interface to various elements described herein. In such scenarios, the interposer 190 could provide an electrical interface routing signals to and/or from the plurality of wires 120, driver circuitry 134, and/or plurality of light-emitter device(s) 132.

Figure 3:
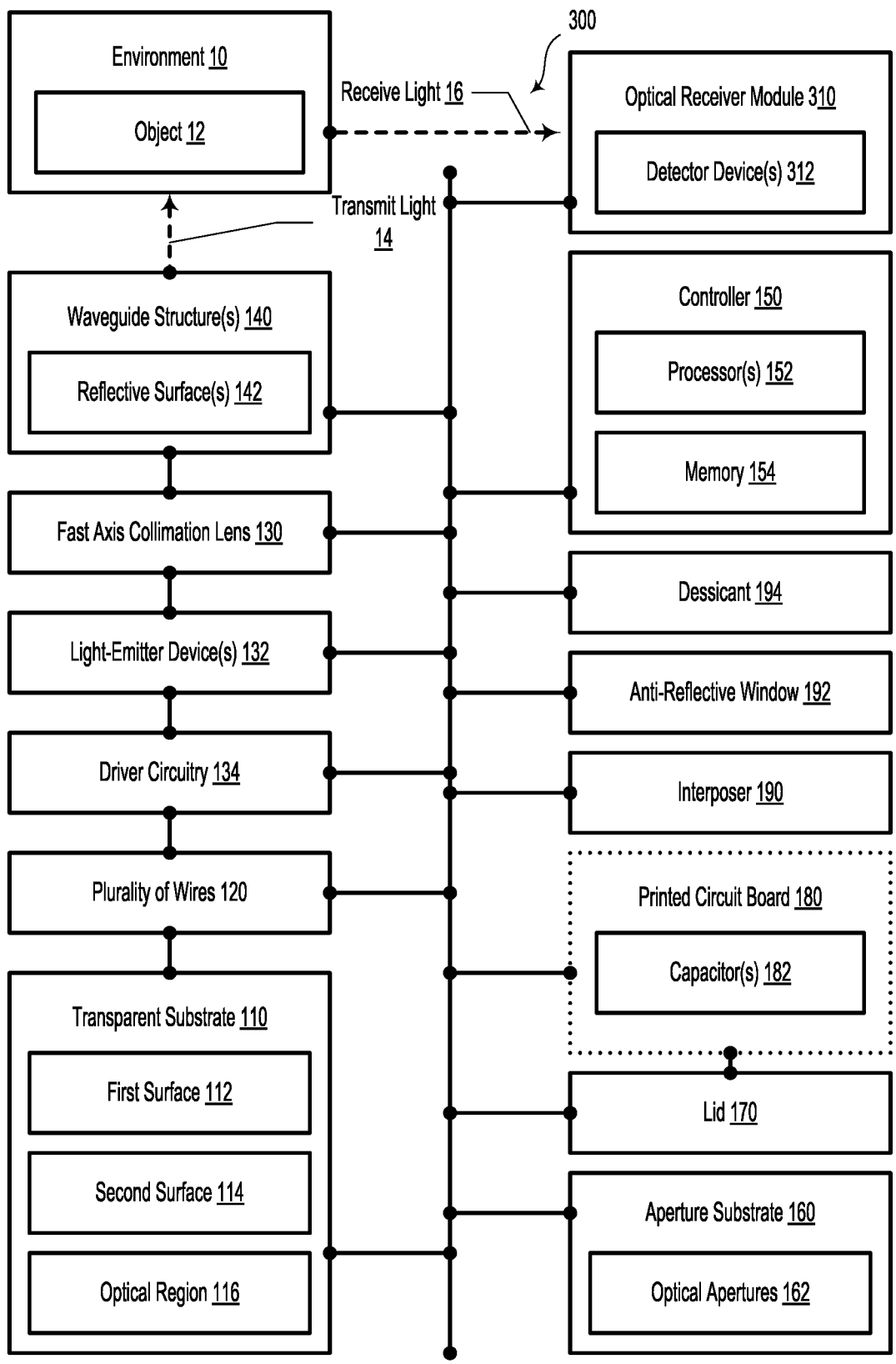
FIG. 3 illustrates a lidar system, according to an example embodiment.

Additionally or alternatively, the interposer 190 could provide a physical and electrical interface for the optical receiver module 310, as described in reference to FIG. 3.

In alternative embodiments, the optical transmitter module 100 could also include an anti-reflective (AR) window 192 coupled proximate to an optical region 116 of a second surface 114 of the transparent substrate 110. In such scenarios, the AR window 192 could be coupled to the transparent substrate 110 by an epoxy. In some embodiments, the AR window 192 could include an optical coating configured to reduce reflections. In some examples, the optical coating could be configured to reduce reflections near wavelengths of light emitted from the light-emitter device(s) 132 (e.g., 905 nm).

In example embodiments, the optical transmitter module 100 could also include a desiccant material 194 disposed within the sealed interior volume (e.g., sealed interior volume 202). In some embodiments, the desiccant material 194 could include a silica gel material. However, other absorbent materials are also possible and contemplated.

In some examples, the optical transmitter module 100 additionally includes a controller 150. The controller 150 includes at least one processor 152 and a memory 154. In some embodiments, the controller 150 could be communicatively coupled (e.g., wirelessly or wired) to various elements of optical transmitter module 100 by way of communication interface 155. For example, the controller 150 could be communicatively coupled to the light-emitter device(s) 132, the driver circuitry(s) 134, and/or the detector device(s) 312 (as illustrated in FIG. 3), and/or other elements described herein in a wired or wireless manner by way of the communication interface 155. The at least one processor 152 is configured to execute instructions stored in the memory 154 so as to carry out operations. For example, the operations could include various methods and/or mode of using the optical transmitter module 100.

Figure 2:
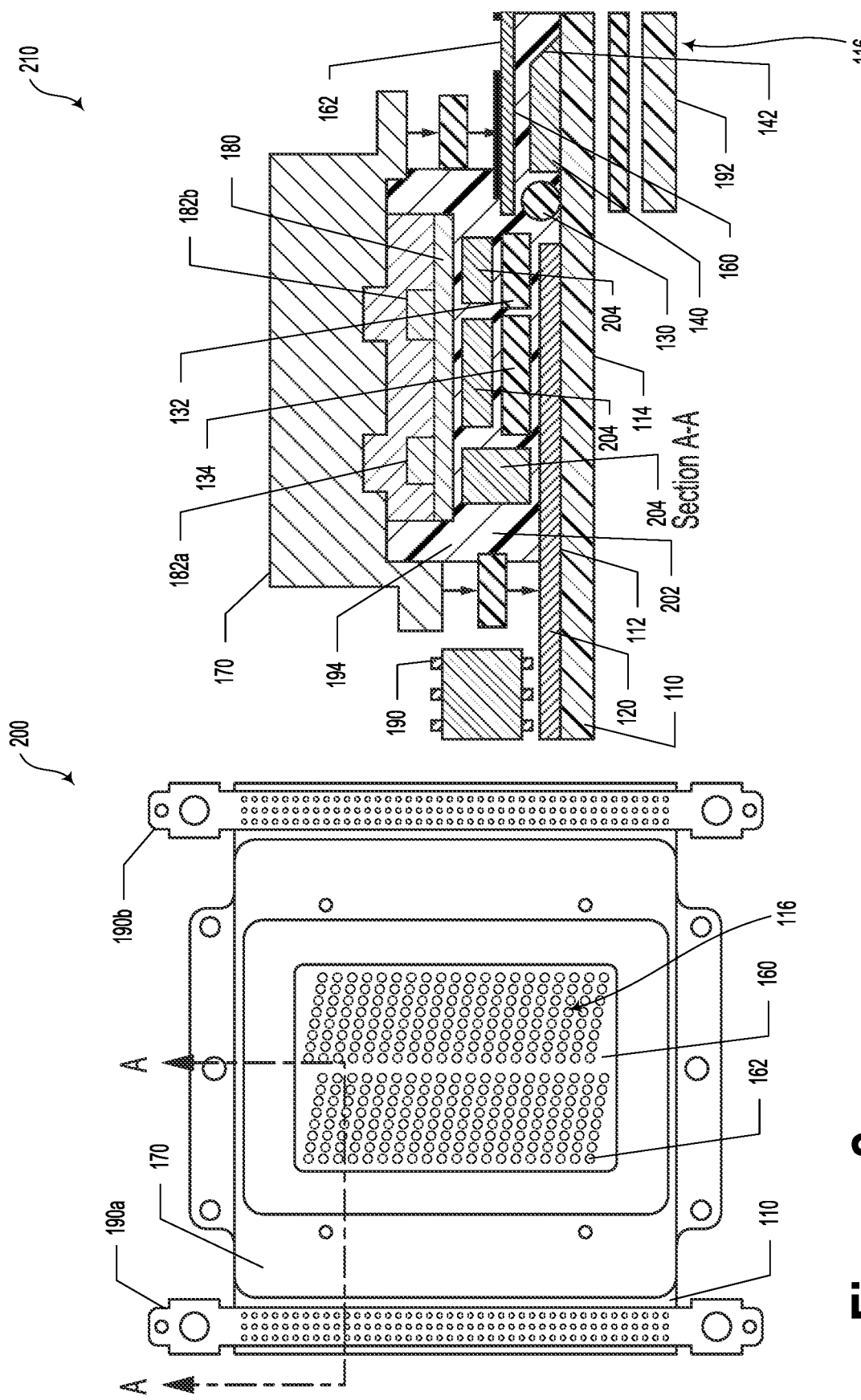
FIG. 2 illustrates a portion of the optical receiver module of FIG. 1, according to an example embodiment.

FIG. 2 illustrates a top down view 200 and a partially-exploded cross-sectional view 210 of the optical transmitter module 100 of FIG. 1, according to an example embodiment. As illustrated in the top-down view 200, the transparent substrate 110 and the aperture substrate 160 could be at least partially covered by a lid 170. The aperture substrate 160 could include a plurality of optical aperture 162. In some examples, the lid 170 may include a central portion (e.g., optical region 116). Additionally or alternatively, interposers 190a and 190b could be coupled to opposing sides of the transparent substrate 110.

Furthermore, as illustrated in the cross-sectional view 210, the optical transmitter module 100 could include a transparent substrate 110 that has a first surface 112 and a second surface 114. A plurality of wires 120 could be formed along the first surface 112. In an example embodiment, the plurality of wires 120 could include conductive traces configured to route electrical signals between the interposer 190, the driver circuitry 134, and/or of light-emitter devices 132.

One or more fast axis collimation (FAC) lenses 130 could be disposed along the first surface 112 of the transparent substrate 110. For example, the FAC lens(es) 130 could be configured to collimate light emitted from the light-emitter device(s) 132 and to facilitate the emitted light to couple into the plurality of waveguide structures 140. In such scenarios, reflective surfaces 142 of the waveguide structures 140 could be configured to direct transmit light 14 through the transparent substrate 110 and through anti-reflective window 192 toward objects 12 in an environment 10.

Additionally, cross-sectional view 210 illustrates that one or more printed circuit boards 180 could be coupled to the laser driver 134 and the plurality of light-emitter device(s) 132 by way of silver epoxy 204 or another electrically- and/or thermally-conductive coupling material. As an example, the silver epoxy 204 could include a conductive thermosetting epoxy paste. Additionally, the optical transmitter module 100 includes an aperture substrate 160 that may include a plurality of optical apertures 162. As an example, the optical apertures 162 could formed by circular pinhole openings in an opaque material. Other shapes and types of optical apertures are possible and contemplated.

As illustrated in FIG. 2, the lid 170 could be coupled to the transparent substrate 110, aperture substrate 160, the driver circuitry 134, the light-emitter device(s) 132, and/or the plurality of wires 120. For example, the lid 170 could help form a sealed interior volume 202. The sealed interior volume 202 could provide protection for various components of the optical transmitter module 100 from the elements. In some embodiments, the sealed interior volume 202 could be provided by an airtight (e.g., hermetic) seal formed by the combination of the lid 170, the printed circuit board 180, driver circuitry 134, light-emitter device(s) 132, transparent substrate 110, and other sealing materials. The airtight seal could prevent air, oxygen, water vapor, dirt, dust, and/or other materials from impinging into the sealed interior volume 202. As such, the sealed interior volume 202 could improve long-term functionality, performance, and/or reliability of the optical transmitter module 100.

III. Example Lidar Systems

FIG. 3 illustrates a lidar system 300, according to an example embodiment. The lidar system 300 includes an optical transmitter module (e.g., optical transmitter module 100). The optical transmitter module 100 includes a transparent substrate (e.g., transparent substrate 110). The optical transmitter module could also include a plurality of wires (e.g., plurality of wires 120) that may be disposed along a first surface (e.g., first surface 112) of the transparent substrate.

The optical transmitter module further includes a driver circuitry (e.g., driver circuitry 134) electrically-coupled to at least a portion of the plurality of wires.

The optical transmitter module yet further includes one or more light-emitter devices (e.g., light-emitter device(s) 132) that are electrically-coupled to at least a portion of the plurality of wires. The one or more light-emitter devices are configured to emit light pulses.

The optical transmitter module also includes a fast axis collimation lens (e.g., fast axis collimation lens 130) that is disposed along the first surface of the transparent substrate 110. The fast axis collimation lens is configured to collimate the light pulses so as to provide collimated light.

The optical transmitter module additionally includes a plurality of waveguide structures (e.g., waveguide structures 140) that are disposed along the first surface of a transparent substrate (e.g., transparent substrate 110) within an optical region (e.g., optical region 116). The waveguide structures include respective reflective surfaces (e.g., reflective surfaces 142). The waveguide structures are configured to optically guide the collimated light toward the respective reflective surfaces so as to provide transmit light (e.g., transmit light 14) to an environment (e.g., environment 10).

The optical transmitter module yet further includes an aperture substrate (e.g., aperture substrate 160) that may include a plurality of optical apertures (e.g., optical apertures 162). In such scenarios, the aperture substrate is disposed proximate to the optical region.

The optical transmitter module additionally includes a lid (e.g., lid 170) coupled to the transparent substrate and the aperture substrate. As an example, the lid could be configured to provide a sealed interior volume (e.g., sealed interior volume 202).

In some examples, the optical transmitter module further includes a printed circuit board (e.g., printed circuit board 180) having at least one capacitor (e.g., capacitors 182). The printed circuit board is disposed between the lid and the driver circuitry and the one or more light-emitter devices.

Additionally or alternatively, the at least one capacitor could be coupled to an upper surface of the driver circuitry. In such scenarios, silicon-based capacitors could be coupled to an ASIC device.

The lidar system 300 also includes an optical receiver module 310. The optical receiver module 310 includes one or more detector devices (e.g., detector device(s) 312) configured to detect receive light (e.g., receive light 16) from the environment by way of the optical region of the transparent substrate and the plurality of optical apertures.

In various embodiments, at least a portion of the detector device(s) 312 could include one or more silicon photomultiplier (SiPM) devices. Other types of photodetector devices are possible and contemplated. As a non-limiting example, detector device(s) 312 could each include one or more semiconductor junctions (e.g., a p-n junction photodiode) configured to detect photons and responsively generate electrical charges and electrical current. In some examples, detector device(s) 312 could be disposed in a two-dimensional array (e.g., a rectangular or square array of detector elements). It will be understood that other arrangements of detector device(s) 312 are considered and possible. In some embodiments, the detector device(s) 312 could include an active-pixel sensor (APS) or a smart sensor. The smart sensor could combine the functionality of an image sensor and image processor in the same integrated circuit. In various embodiments, the smart sensor could include one or more processors in the same integrated circuit package. In some embodiments, the detector device(s) 312 could include a passive-pixel sensor (PPS). In alternative examples, the detector device(s) 312 could include a charge coupled device (CCD) image sensor or a complementary metal oxide semiconductor (CMOS) image sensor.

In some embodiments, the lidar system 300 could include a controller (e.g., controller 150) having at least one processor and a memory. At least one processor executes program instructions so as to carry out operations. The operations include causing the driver circuitry to generate a plurality of current pulses so as to cause the light-emitter devices to emit light pulses and provide transmit light (e.g., transmit light 14) into an environment (e.g., environment 10).

The operations may additionally include receiving, from the detector device(s), receive light (e.g., receive light 16) from the environment.

The operations yet further include determining, based on the received light, information indicative of objects in the environment.

In example embodiments, the lidar system 300 could include a plurality of optical baffles 422 that are configured to optically isolate the respective optical channels. Respective optical channels could include, for example, various elements of the optical receiver module (e.g., respective apertures, lens elements, optical filters, and/or detector devices) that are configured to detect light pulses from a particular region of the environment.

In some embodiments, the lidar system 300 could also include a main lens. In such scenarios, the main lens could be optically coupled to the optical apertures 162. In some embodiments, the main lens could be formed from various visible and/or infrared light-transmissive materials, such as glass, polycarbonate, etc. As an example, the main lens could be substantially transparent to light between approximately 800 nm to 1000 nm.

Figure 4A:
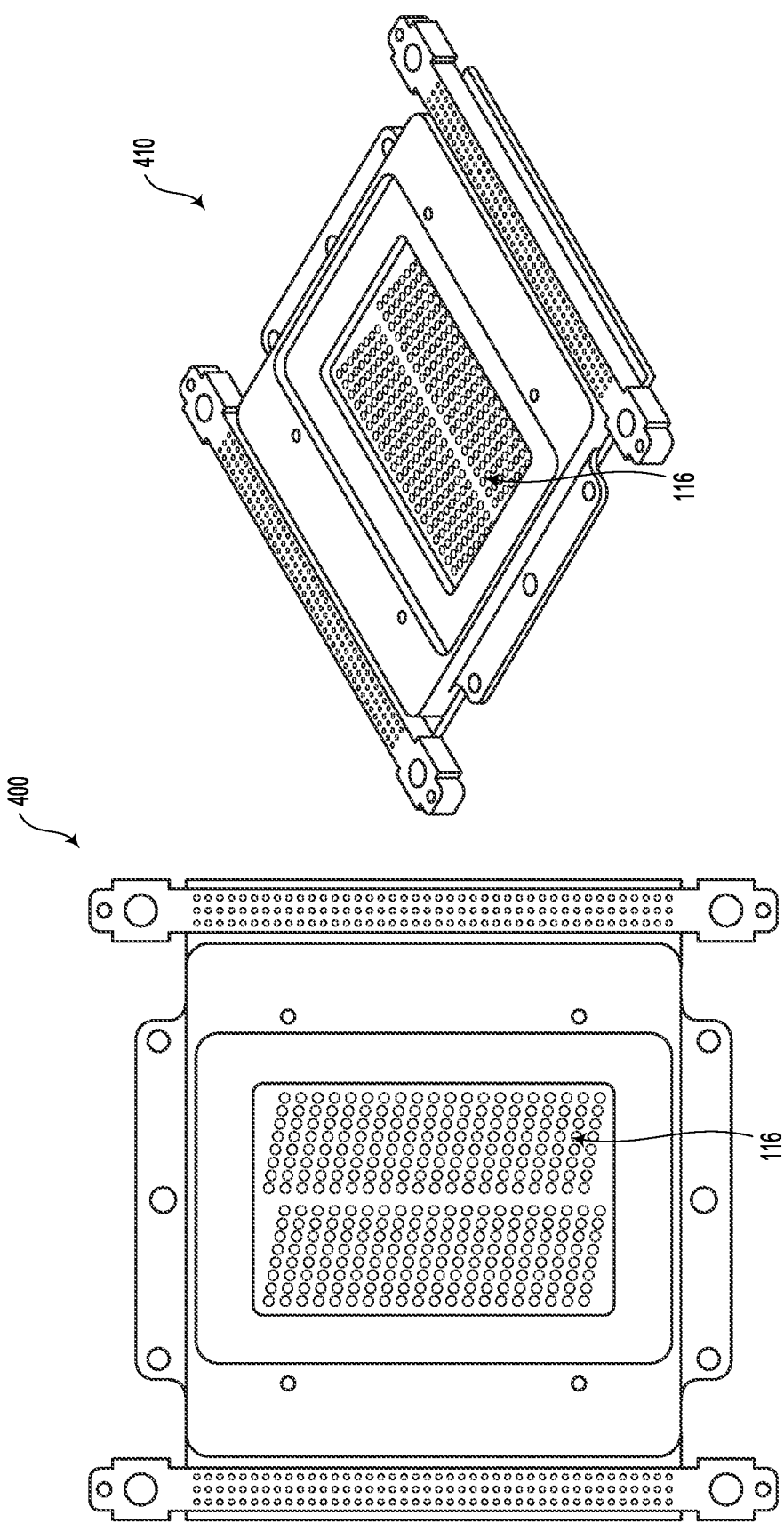
FIG. 4A illustrates a portion of the lidar system of FIG. 3, according to an example embodiment.

FIG. 4A illustrates various views 400 and 410 of the lidar system 300 of FIG. 3, according to an example embodiment. View 400 includes a top-down view of the lidar system 300. View 410 includes an oblique angle view of the lidar system 300. Views 400 and 410 illustrate the optical region 116 of the optical transmitter module 100.

Figure 4B:
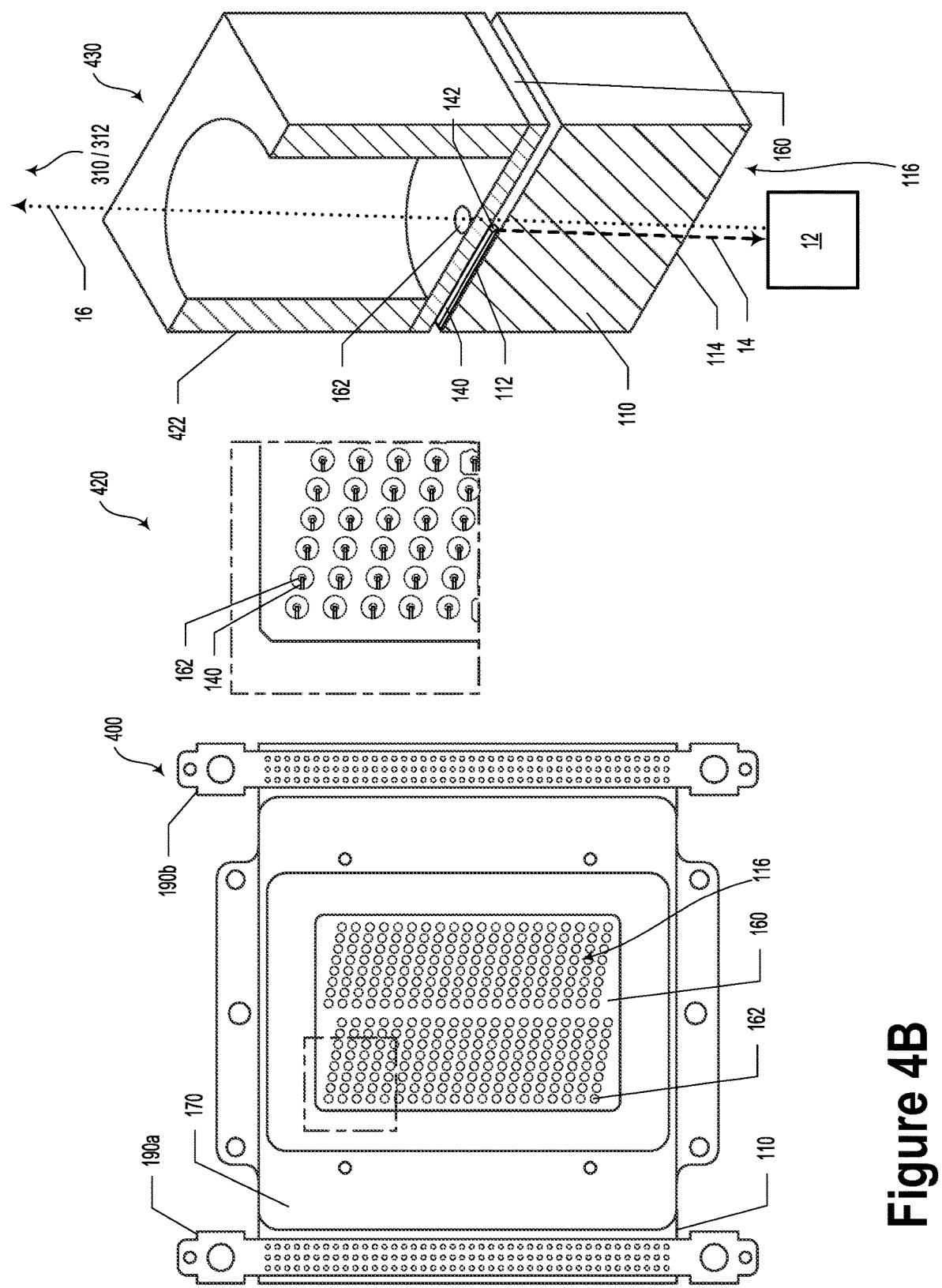
FIG. 4B illustrates a portion of the lidar system of FIG. 3, according to an example embodiment.
Figure 5A:
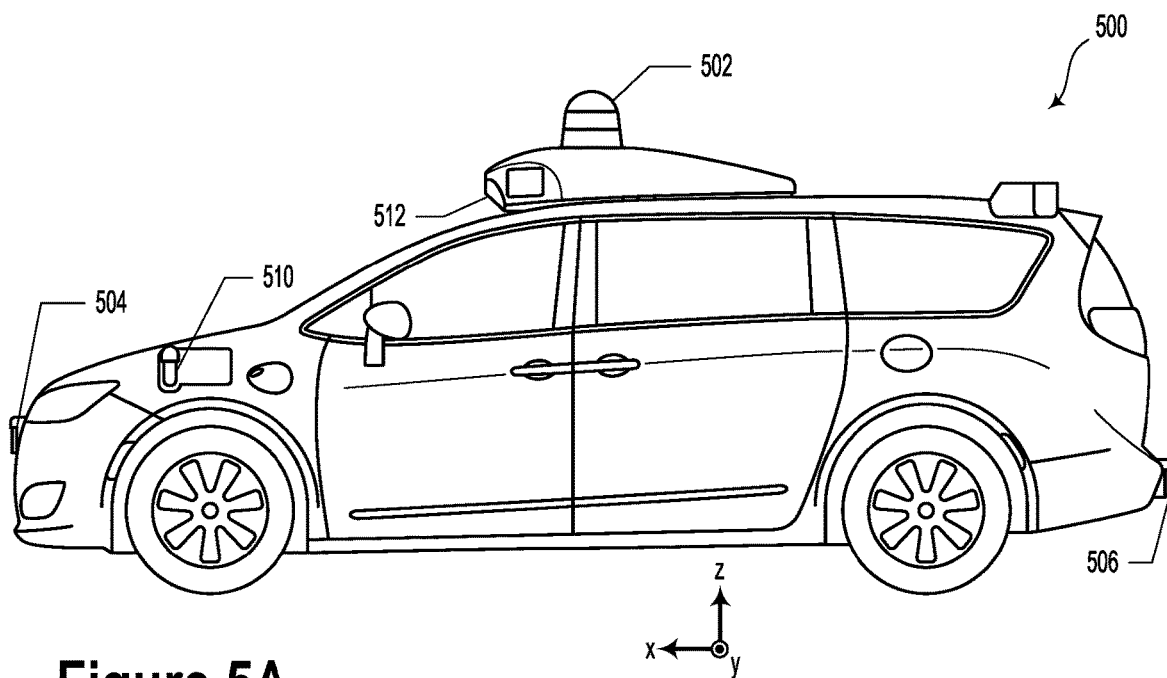
FIG. 5A illustrates a vehicle, according to an example embodiment.
Figure 5B:
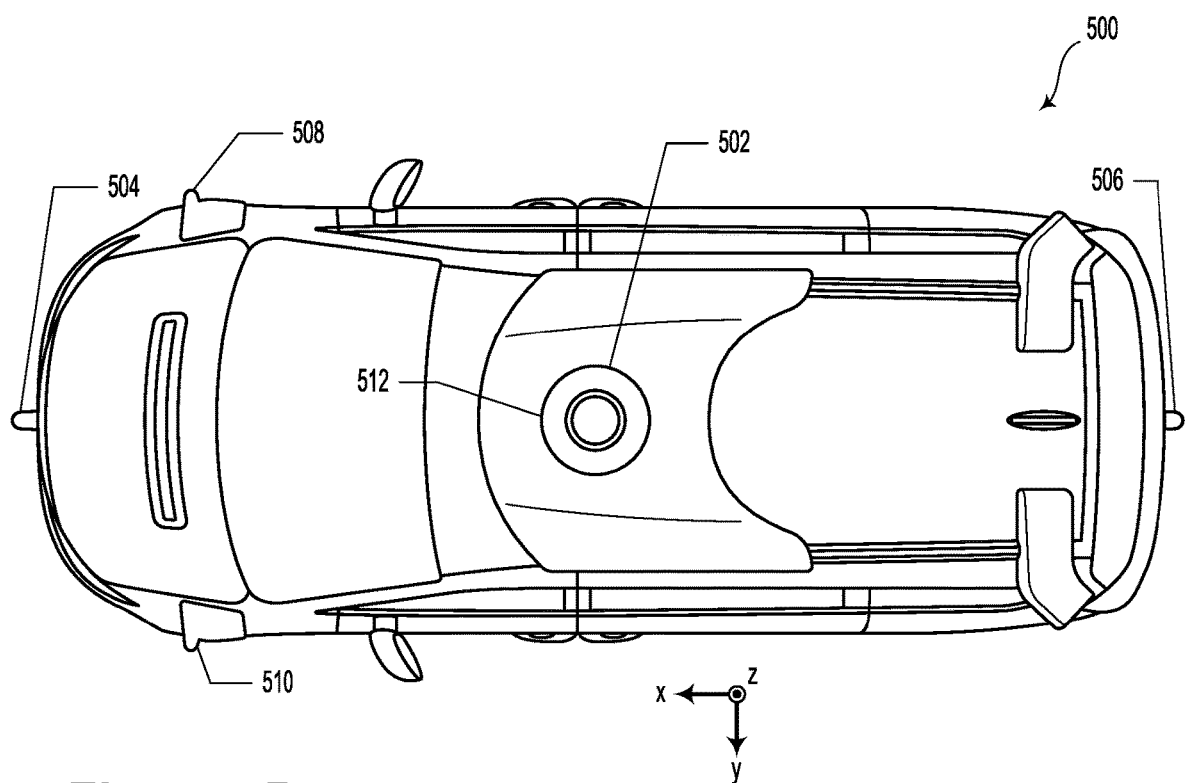
FIG. 5B illustrates a vehicle, according to an example embodiment.
Figure 5C:
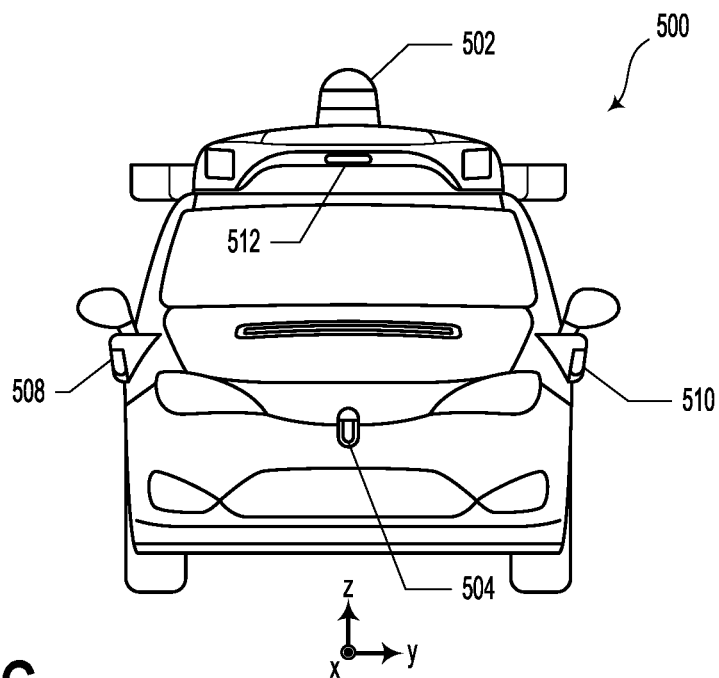
FIG. 5C illustrates a vehicle, according to an example embodiment.
Figure 5D:
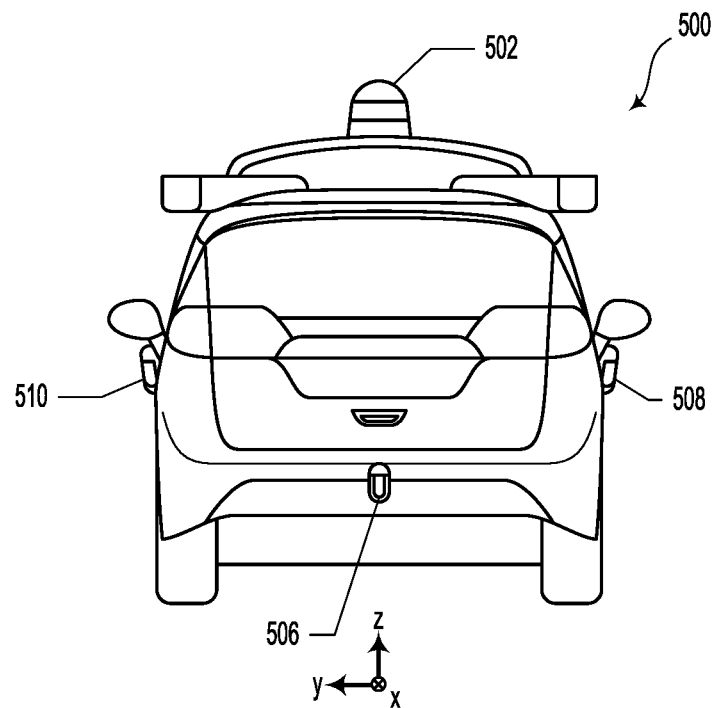
FIG. 5D illustrates a vehicle, according to an example embodiment.
Figure 5E:
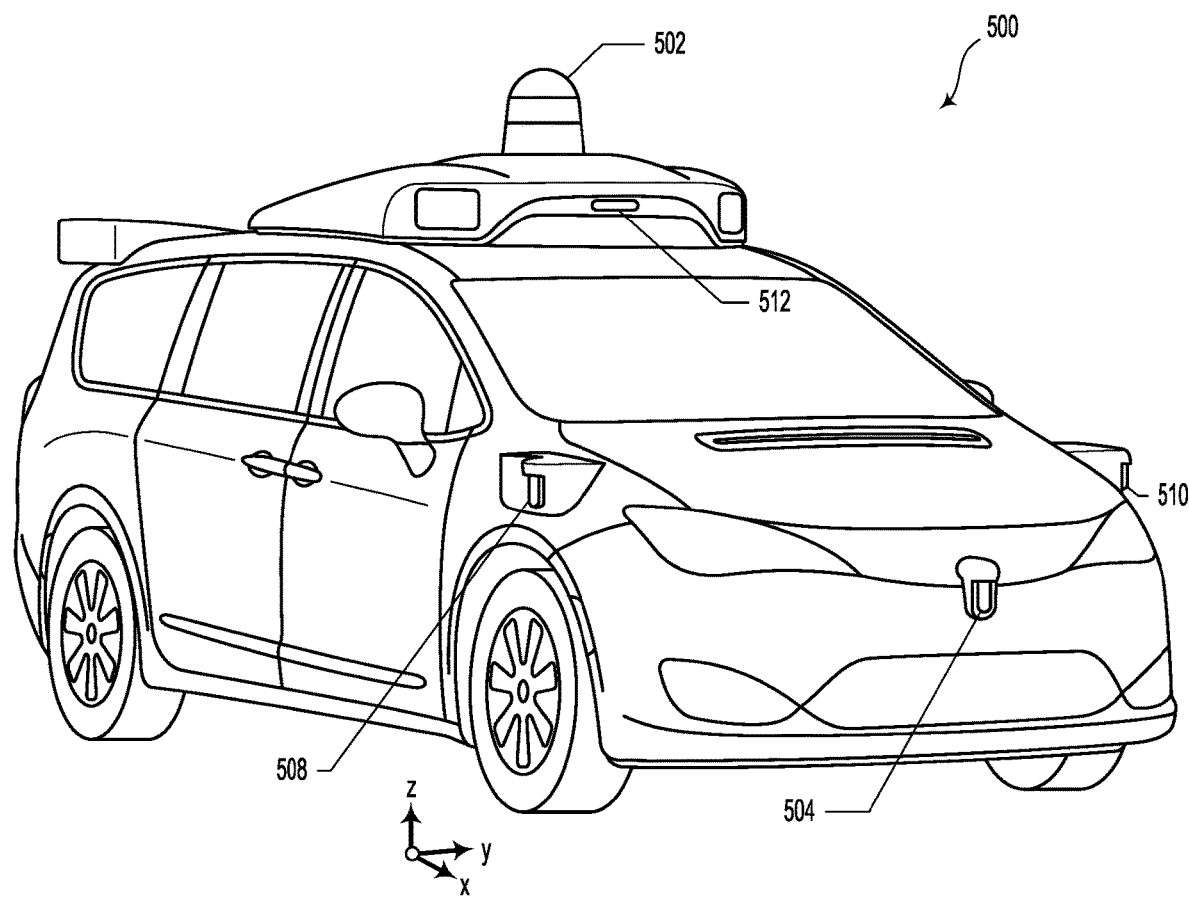
FIG. 5E illustrates a vehicle, according to an example embodiment.

FIG. 4B illustrates views 420 and 430 of the lidar system 300 of FIG. 3, according to an example embodiment. View 420 includes a close-up, top-down view of a portion of the optical transmitter module 100. View 420 illustrates a plurality of optical apertures 162 and corresponding waveguide structures 140.

View 430 is an oblique angle, cross-section view of a single optical channel of the lidar system 300. Light emitted from the light-emitter device(s) 132 could be guided along the waveguide structure 140. The reflective surface 142 may interact with the emitted light so as to direct transmit light 14 toward objects 12 in the environment 10. Reflected light could return to the optical channel as receive light 16. In such a scenario, a baffle 422 may optically isolate the receive light 16 so as to reduce cross-talk and/or interference with adjacent optical channels.

IV. Example Vehicles

FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of autonomous vehicle, robot, or drone that can navigate within its environment using sensors and other information about its environment.

In some examples, the vehicle 500 may include one or more sensor systems 502, 504, 506, 508, 510, and 512. In some embodiments, sensor systems 502, 504, 506, 508, 510 and/or 512 could include optical transmitter module 100 and/or lidar system 300 as illustrated and described in relation to FIGS. 1 and 3. In other words, devices and systems described elsewhere herein could be coupled to the vehicle 500 and/or could be utilized in conjunction with various operations of the vehicle 500. As an example, the optical transmitter module 100 and/or lidar system 300 could be utilized in self-driving or other types of navigation, planning, perception, and/or mapping operations of the vehicle 500.

In some examples, the one or more devices or systems could be disposed in various locations on the vehicle 500 and could have fields of view that correspond to internal and/or external environments of the vehicle 500.

While the one or more sensor systems 502, 504, 506, 508, 510, and 512 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

The one or more sensor systems 502, 504, 506, 508, 510, and/or 512 could include other lidar sensors. For example, the other lidar sensors could include one or more light-emitter devices arranged over a range of angles with respect to a given plane (e.g., the x-y plane). For example, one or more of the sensor systems 502, 504, 506, 508, 510, and/or 512 may be configured to scan about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, 510, and/or 512 may be configured to provide respective point cloud information that may relate to physical objects within the environment of the vehicle 500. While vehicle 500 and sensor systems 502, 504, 506, 508, 510, and 512 are illustrated as including certain features, it will be understood that other types of sensor systems are contemplated within the scope of the present disclosure.

While lidar systems with single light-emitter devices are described and illustrated herein, lidar systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 5A-5E illustrate various lidar sensors attached to the vehicle 500, it will be understood that the vehicle 500 could incorporate other types of sensors.

In some embodiments, the one or more sensor systems 502, 504, 506, 508, 510, and/or 512 could include image sensors. For example, vehicle 500 could include a camera system that includes an image sensor configured to provide images of a field of view. In various examples, the image sensor includes a plurality of detector elements.

V. Example Methods

Figure 6:
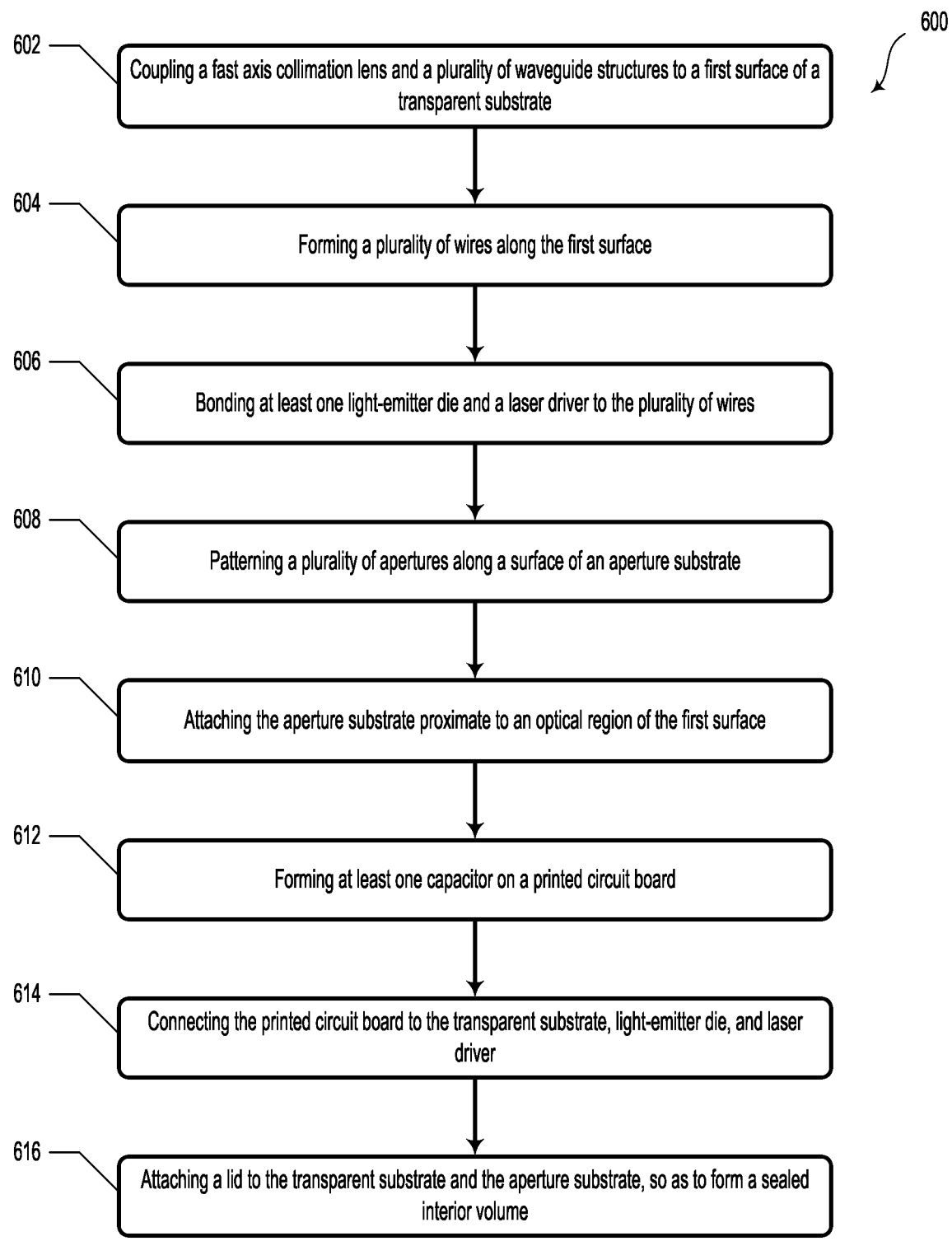
FIG. 6 illustrates a method, according to an example embodiment.

FIG. 6 illustrates a method 600, according to an example embodiment. While method 600 illustrates several blocks of a method of manufacture, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 600 may be carried out so as to form the optical transmitter module 100 and/or lidar system 300, as illustrated and described in reference to FIGS. 1 and 3, respectively.

FIGS. 7A-7I illustrate portions of the method 600. The various blocks of method 600 will now be described below in reference to FIGS. 7A-7I.

Block 602 includes coupling a fast axis collimation lens (e.g., fast axis collimation lens 130) and one or more waveguide structures (waveguide structure(s) 140) to a first surface (e.g., first surface 112) of a transparent substrate (e.g., transparent substrate 110). Block 602 is illustrated by way of example in FIG. 7A.

In various examples, coupling the fast axis collimation lens and the waveguide structures to the first surface could include fastening such elements together by way of a thermoset epoxy or another adhesive material.

Block 604 includes forming a plurality of wires (e.g., plurality of wires 120) along the first surface. Block 604 is illustrated by way of example in FIG. 7B. In example embodiments, the plurality of wires could include tin-lead, silver, or gold-plated copper solder pads. In some embodiments, forming the plurality of wires could include patterning the first surface with a lithography process according to a wire pattern. For example, block 604 could include utilizing an optical lithography process. Such a scenario may include for example, a lithography mask (e.g., based on the wire pattern) and lithography exposure system to expose a positive-tone or negative-tone photoresist. Following the lithography step, a conductive material could be electroplated according to the wire pattern so as to form the plurality of wires.

Additionally or alternatively, the plurality of wires could be formed by utilizing an additive process (e.g., metal deposition and liftoff) or subtractive processing method (e.g., metal etch). Other fabrication methods (e.g., screen printing) to form conductive traces are possible and contemplated.

Block 606 includes bonding at least one light-emitter device (e.g., light-emitter device(s) 132) and driver circuitry (e.g., driver circuitry 134) to the plurality of wires. Block 606 is illustrated by way of example in FIG. 7C. Bonding the light-emitter device(s) and the driver circuitry to the plurality of wires could include utilizing a surface mount bonding process. For example, the light-emitter device(s) and driver circuitry could be positioned using a pick-and-place system. Additionally, the light-emitter device(s), driver circuitry, plurality of wires, and the transparent substrate could be placed in a solder reflow oven. When heated, the light-emitter device(s) and driver circuitry could be physically and electrically-coupled to the plurality of wires and underlying substrate by way of a reflowable solder bond.

Block 608 includes patterning a plurality of apertures (e.g., optical apertures 162) along a surface of an aperture substrate (e.g., aperture substrate 160). Block 608 is illustrated by way of example in FIG. 7D. Patterning the plurality of apertures could include utilizing a photolithography process to define pinhole apertures in an optically opaque material.

Block 610 includes attaching the aperture substrate proximate to an optical region (e.g., optical region 116) of the first surface. Block 610 is illustrated by way of example in FIG. 7E.

Block 612 includes forming at least one capacitor (e.g., capacitors 182) on a printed circuit board (e.g., printed circuit board 180). Block 612 is illustrated by way of example in FIG. 7F. As an alternative, the at least one capacitor could be coupled to, or formed on, the driver circuitry. As an example, silicon capacitors could be surface-mounted to an ASIC laser driver.

Block 614 optionally includes connecting the printed circuit board to the transparent substrate, the light-emitter die, and the driver circuitry. Block 614 is illustrated by way of example in FIG. 7G. In some examples, connecting the printed circuit board could include applying silver epoxy or another type of conductive thermoset epoxy between the printed circuit board and the transparent substrate, the light-emitter die, and the driver circuitry.

Block 616 includes attaching a lid (e.g., lid 170) to the transparent substrate and the aperture substrate, so as to form a sealed interior volume (e.g., sealed interior volume 202). Block 616 is illustrated by way of example in FIG. 7H. In some embodiments, attaching the lid could include applying a thermal interface material (TIM) between the lid and the printed circuit board and/or the driver circuitry. Additionally or alternatively, the method 600 could include applying epoxy between the lid and the transparent substrate and the aperture substrate.

Figure 7A:
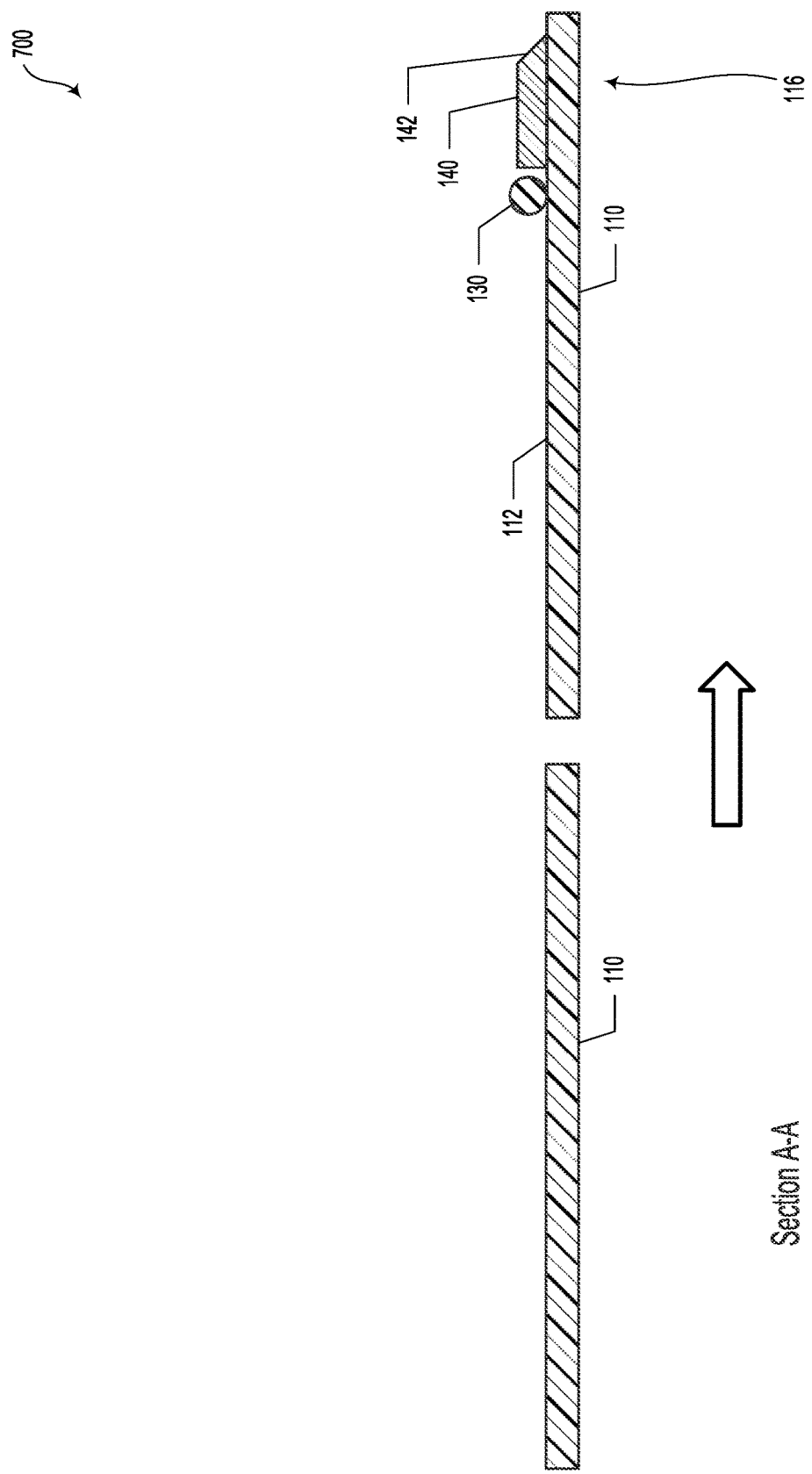
FIG. 7A illustrates a portion of the method of FIG. 6, according to an example embodiment.
Figure 7B:
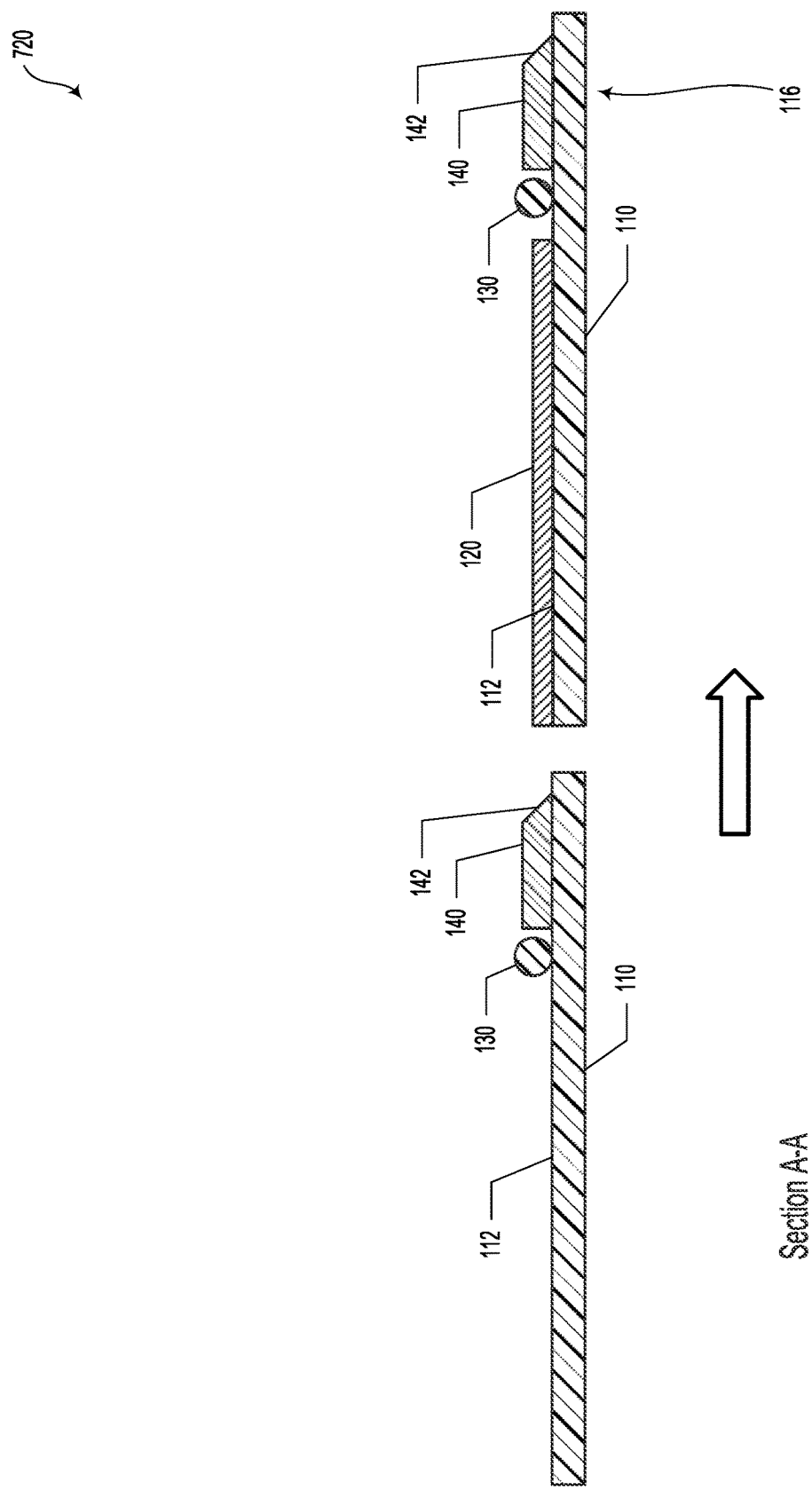
FIG. 7B illustrates a portion of the method of FIG. 6, according to an example embodiment.
Figure 7C:
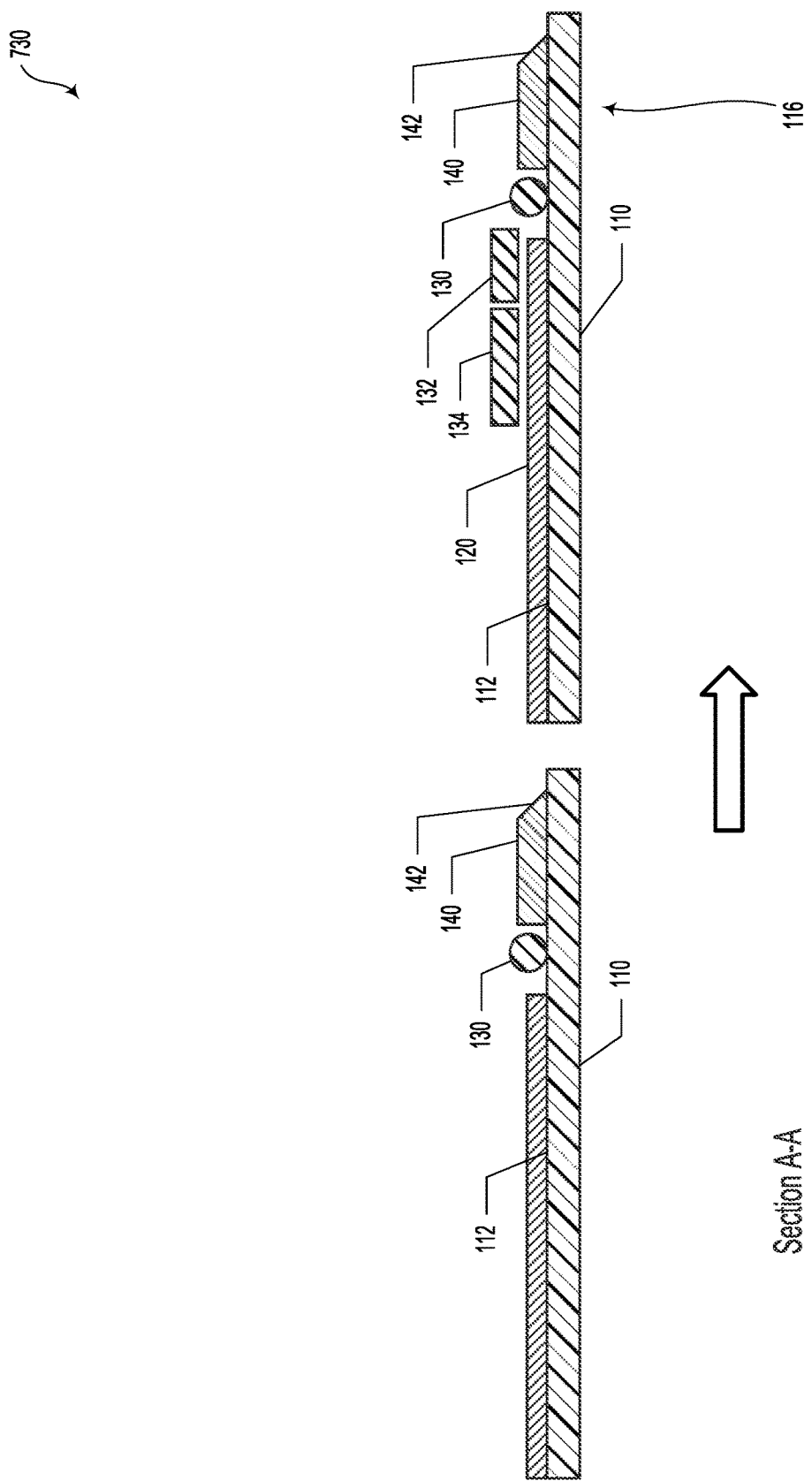
FIG. 7C illustrates a portion of the method of FIG. 6, according to an example embodiment.
Figure 7D:
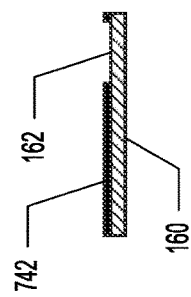
FIG. 7D illustrates a portion of the method of FIG. 6, according to an example embodiment.
Figure 7D:
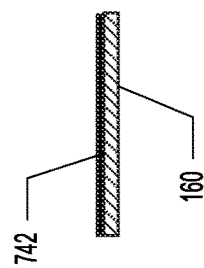
Figure 7E:
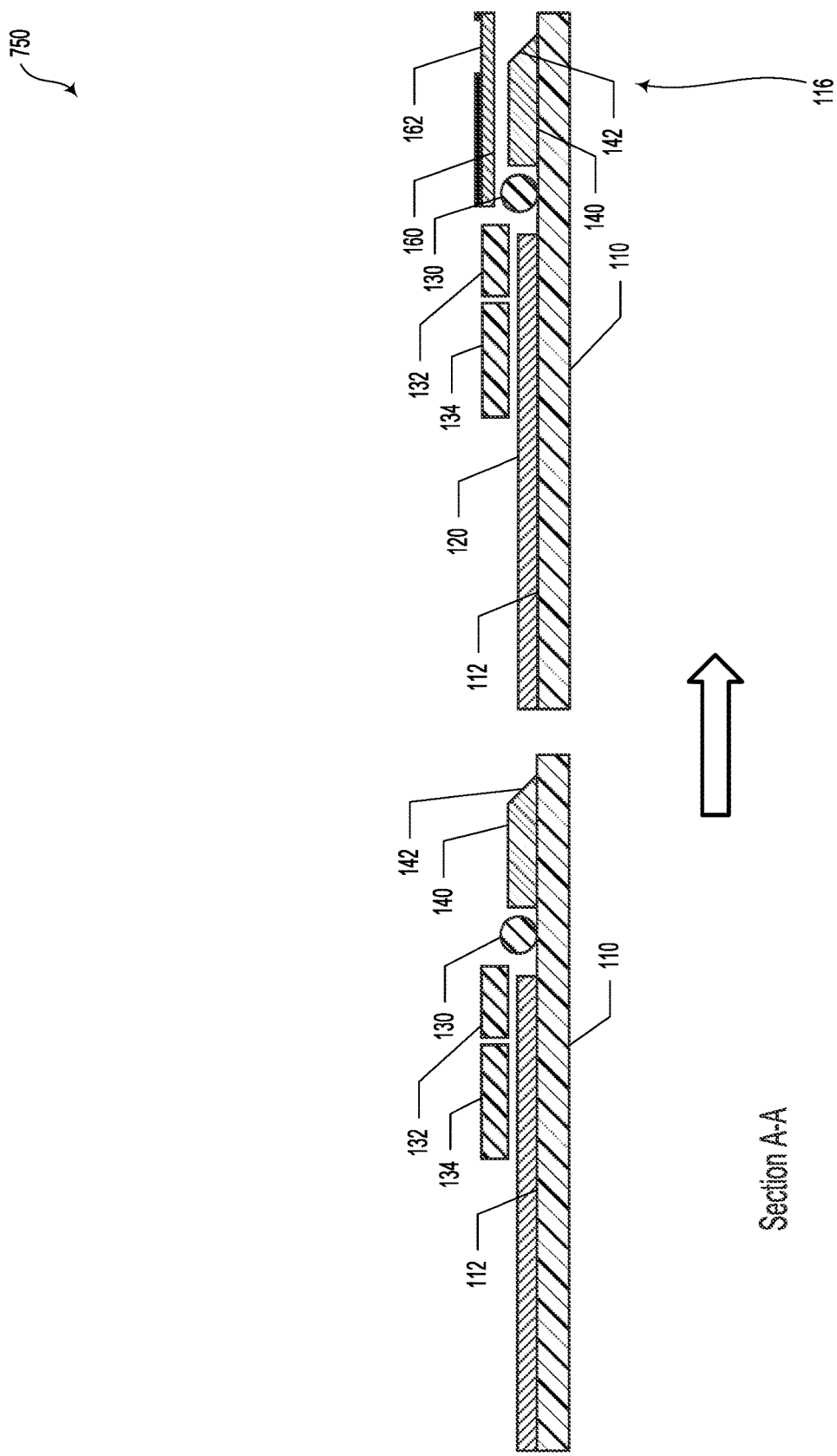
FIG. 7E illustrates a portion of the method of FIG. 6, according to an example embodiment.
Figure 7F:
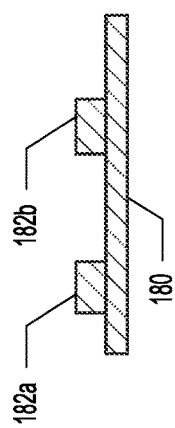
FIG. 7F illustrates a portion of the method of FIG. 6, according to an example embodiment.
Figure 7F:
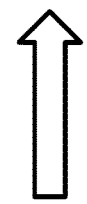
Figure 7F:
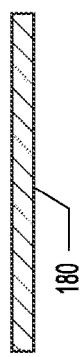
Figure 7G:
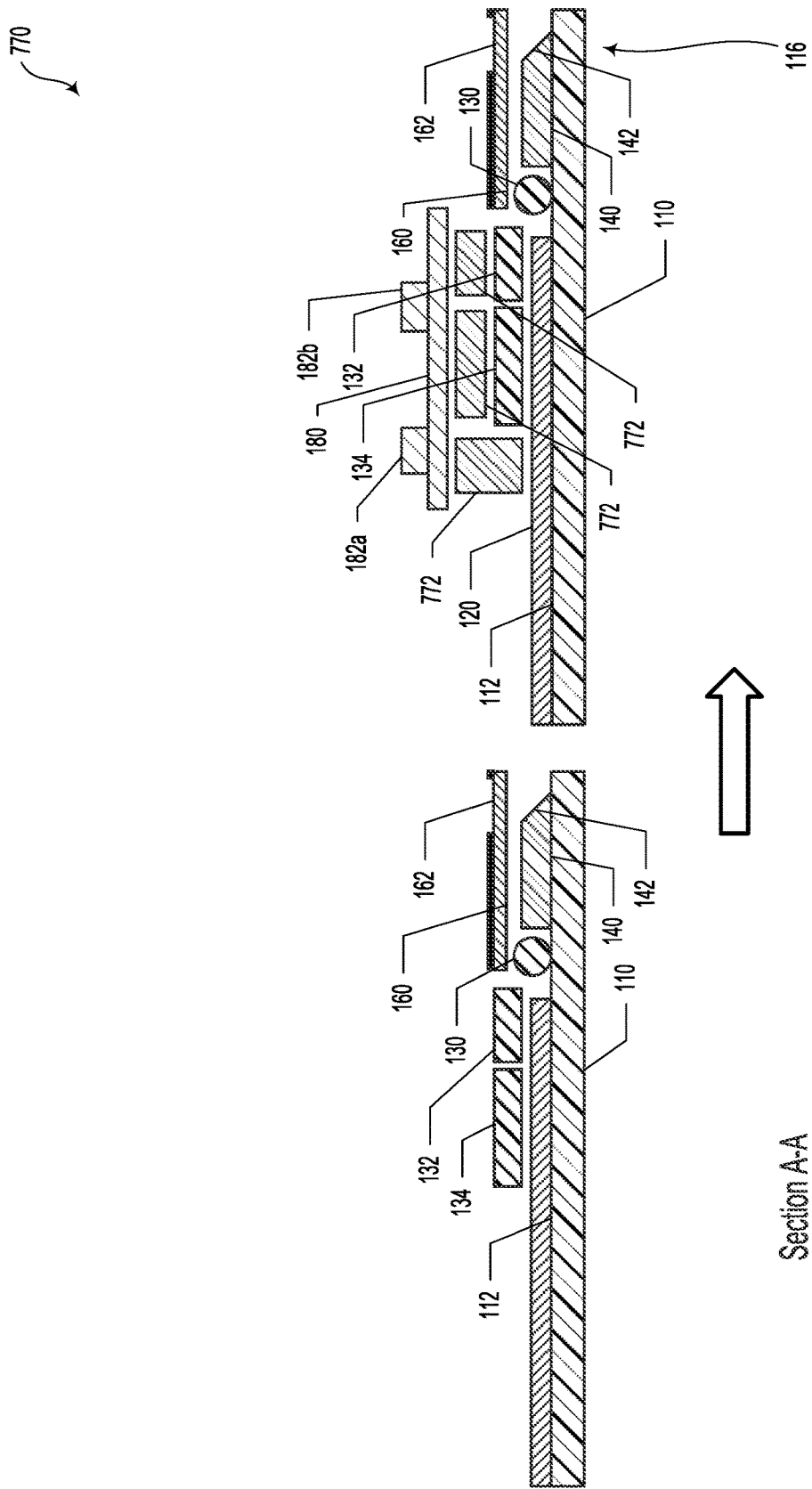
FIG. 7G illustrates a portion of the method of FIG. 6, according to an example embodiment.
Figure 7H:
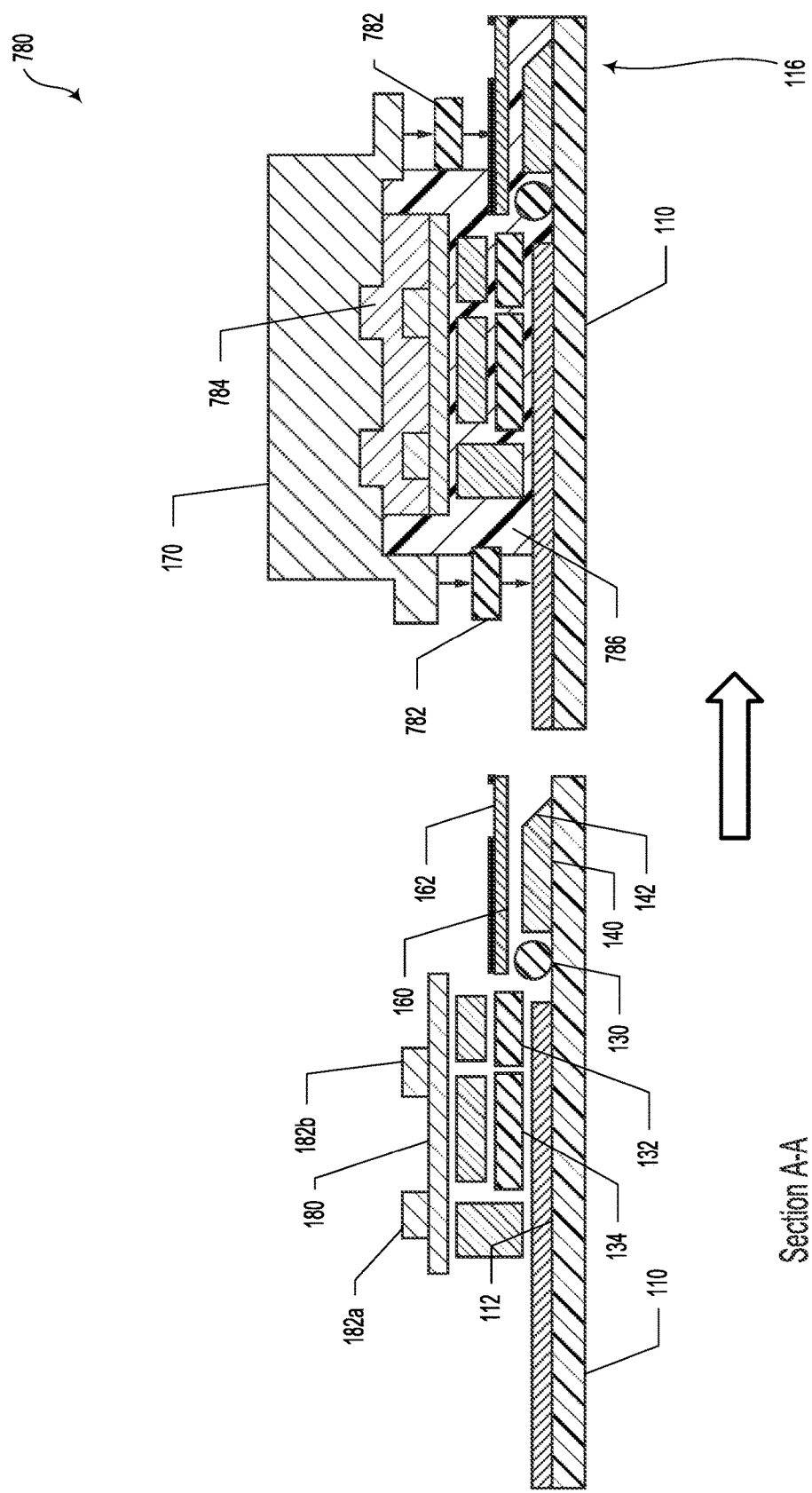
FIG. 7H illustrates a portion of the method of FIG. 6, according to an example embodiment.
Figure 7I:
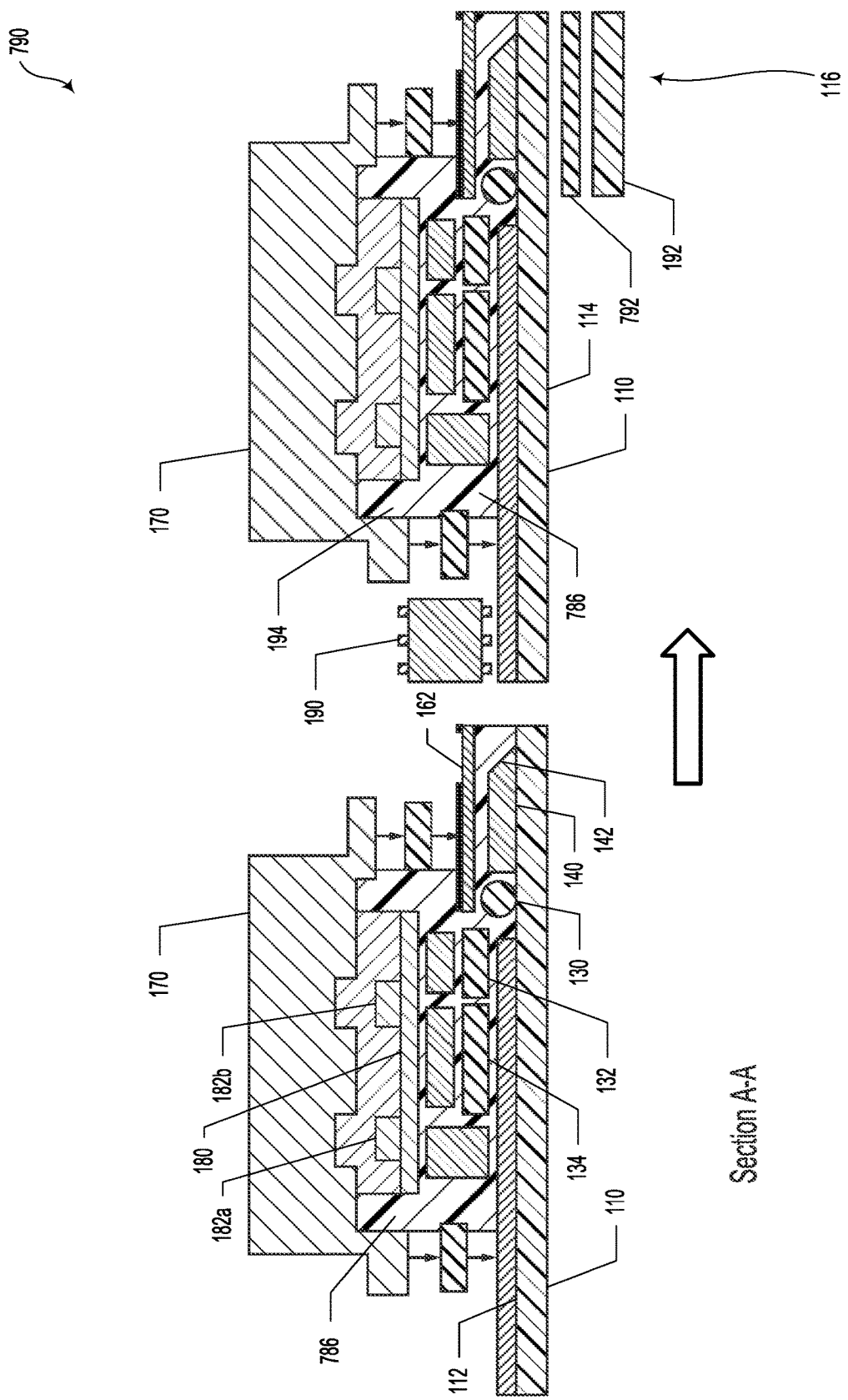
FIG. 7I illustrates a portion of the method of FIG. 6, according to an example embodiment.

FIG. 7I illustrates further optional blocks of method 600. For example, method 600 could include attaching a spring-spring interposer (e.g., interposer 190) to the wires along the first surface.

Additionally or alternatively, method 600 could include attaching an anti-reflective (AR) window (e.g., anti-reflective window 192) proximate to an optical region of a second surface of the transparent substrate. In such scenarios, attaching the AR window could include applying an epoxy between the AR window and the transparent substrate.

In some embodiments, method 600 could also include providing a desiccant material (e.g., desiccant 194) within the sealed interior volume. As an example, the desiccant material could include silica, silica gel, zeolite, synthetic polymers, or other absorbent and/or hygroscopic materials.

In example embodiments, method 600 could also include attaching an optical receiver module (e.g., optical receiver module 310) proximate to the lid. In such a scenario, the optical receiver module includes one or more detector devices (e.g., detector device(s) 312) that are configured to detect receive light (e.g., receive light 16) from an environment (e.g., environment 10) by way of the optical region of the transparent substrate and the plurality of optical apertures.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical transmitter module, comprising:
a transparent substrate;
a plurality of wires disposed along a first surface of the transparent substrate;
driver circuitry electrically-coupled to at least a portion of the plurality of wires;
one or more light-emitter devices electrically-coupled to at least a portion of the plurality of wires, wherein the one or more light-emitter devices are configured to emit light pulses;
a fast axis collimation lens disposed along the first surface, wherein the fast axis collimation lens is configured to collimate the light pulses so as to provide collimated light;
one or more waveguide structures disposed along the first surface of the transparent substrate within an optical region, wherein the one or more waveguide structures comprise respective reflective surfaces, wherein the one or more waveguide structures are configured to optically guide the collimated light toward the respective reflective surfaces so as to provide transmit light to an environment;
an aperture substrate comprising a plurality of optical apertures, wherein the aperture substrate is disposed proximate to the optical region;
a lid coupled to the transparent substrate and the aperture substrate, wherein the lid is configured to provide a sealed interior volume; and
at least one capacitor disposed between the lid and the driver circuitry.

2. The optical transmitter module of claim 1, wherein the plurality of wires comprise an electroplated conductive material.

3. The optical transmitter module of claim 1, further comprising a printed circuit board, wherein the printed circuit board is coupled to the driver circuitry and the one or more light-emitter devices by way of silver epoxy.

4. The optical transmitter module of claim 1, further comprising a thermal interface material (TIM) disposed between the lid and the at least one capacitor.

5. The optical transmitter module of claim 1, wherein the lid is coupled to the transparent substrate and the aperture substrate by an epoxy.

6. The optical transmitter module of claim 1, further comprising:
a spring-spring interposer electrically-coupled to a portion of the wires.

7. The optical transmitter module of claim 1, further comprising:
an anti-reflective (AR) window coupled proximate to an optical region of a second surface of the transparent substrate.

8. The optical transmitter module of claim 7, wherein the AR window is coupled to the transparent substrate by an epoxy.

9. The optical transmitter module of claim 1, further comprising:
a desiccant material disposed within the sealed interior volume.

10. A lidar system comprising:
an optical transmitter module comprising:
a transparent substrate;
a plurality of wires disposed along a first surface of the transparent substrate;
driver circuitry electrically-coupled to at least a portion of the plurality of wires;
one or more light-emitter devices electrically-coupled to at least a portion of the plurality of wires, wherein the one or more light-emitter devices are configured to emit light pulses;
a fast axis collimation lens disposed along the first surface, wherein the fast axis collimation lens is configured to collimate the light pulses so as to provide collimated light;
one or more waveguide structures disposed along the first surface of the transparent substrate within an optical region, wherein the one or more waveguide structures comprise respective reflective surfaces, wherein the one or more waveguide structures are configured to optically guide the collimated light toward the respective reflective surfaces so as to provide transmit light to an environment;
an aperture substrate comprising one or more optical apertures, wherein the aperture substrate is disposed proximate to the optical region;
a lid coupled to the transparent substrate and the aperture substrate, wherein the lid is configured to provide a sealed interior volume; and
at least one capacitor disposed between the lid and the driver circuitry; and
an optical receiver module comprising:
one or more detector devices configured to detect light received from the environment by way of the optical region of the transparent substrate and the one or more optical apertures.

11. The lidar system of claim 10, further comprising:
a processor coupled to the optical transmitter module and the optical receiver module;
a housing; and
a vehicle coupled to the housing.

12. A method, comprising:
coupling a fast axis collimation lens and one or more waveguide structures to a first surface of a transparent substrate;
forming a plurality of wires along the first surface;
bonding at least one light-emitter device and driver circuitry to the plurality of wires wherein the fast axis collimation lens is located between the at least one light-emitter device and the one or more waveguide structures;
patterning one or more optical apertures along a surface of an aperture substrate;
attaching the aperture substrate proximate to an optical region of the first surface;
forming at least one capacitor on the driver circuitry; and
attaching a lid to the transparent substrate and the aperture substrate, so as to form a sealed interior volume.

13. The method of claim 12, wherein forming the plurality of wires comprises:

patterning the first surface with a lithography process according to a wire pattern; and electroplating a conductive material according to the wire pattern so as to form the plurality of wires.

14. The method of claim 12, further comprising applying silver epoxy between the transparent substrate, light-emitter die, and driver circuitry.

15. The method of claim 12, wherein attaching the lid comprises:

applying a thermal interface material (TIM) between the lid and the driver circuitry; and applying epoxy between the lid and the transparent substrate and the aperture substrate.

16. The method of claim 12, further comprising:

attaching a spring-spring interposer to the wires along the first surface.

17. The method of claim 12, further comprising:

attaching an anti-reflective (AR) window proximate to an optical region of a second surface of the transparent substrate.

18. The method of claim 17, wherein attaching the AR window comprises applying an epoxy between the AR window and the transparent substrate.

19. The method of claim 12, further comprising:

providing a desiccant material within the sealed interior volume.

20. The method of claim 12, further comprising:

attaching an optical receiver module proximate to the lid, wherein the optical receiver module comprises at least one detector device configured to detect receive light from an environment by way of the optical region of the transparent substrate and the one or more optical apertures.

* * * * *